US008904064B2

(12) United States Patent
Bellows et al.

(10) Patent No.: US 8,904,064 B2
(45) Date of Patent: Dec. 2, 2014

(54) MANAGING AN OUT-OF-ORDER ASYNCHRONOUS HETEROGENEOUS REMOTE DIRECT MEMORY ACCESS (RDMA) MESSAGE QUEUE

(75) Inventors: Gregory Howard Bellows, Austin, TX (US); Jason N. Dale, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/257,577

(22) Filed: Oct. 24, 2008

(65) Prior Publication Data

US 2010/0106948 A1 Apr. 29, 2010

(51) Int. Cl.
*G06F 3/00* (2006.01)
*G06F 5/00* (2006.01)
*G06F 13/28* (2006.01)

(52) U.S. Cl.
CPC ...................................... *G06F 13/28* (2013.01)
USPC ........................................................... 710/52

(58) Field of Classification Search
None
See application file for complete search history.

(56) References Cited

U.S. PATENT DOCUMENTS

| 5,224,215 A * | 6/1993 | Disbrow ........................ 709/234 |
| 5,797,005 A * | 8/1998 | Bahls et al. .................... 719/314 |
| 6,108,757 A * | 8/2000 | Arshad ........................... 711/152 |
| 7,249,230 B2 * | 7/2007 | Chieh ............................ 711/154 |
| 7,680,987 B1 * | 3/2010 | Clark et al. .................... 711/147 |
| 2007/0083755 A1 * | 4/2007 | Iwamoto ........................ 713/164 |

OTHER PUBLICATIONS

Narravula et al., High Performance Distributed Lock Management Services using Network-based Remote Atomic Operations, 2007, IEEE, pp. 1-8.*

* cited by examiner

*Primary Examiner* — Ernest Unelus
*Assistant Examiner* — Dayton Lewis-Taylor
(74) *Attorney, Agent, or Firm* — James L. Baudino

(57) ABSTRACT

A system and method operable to manage a message queue is provided. This management may involve out-of-order asynchronous heterogeneous remote direct memory access (RDMA) to the message queue. This system includes a pair of processing devices, a primary processing device and an additional processing device, a memory in storage location and a data bus coupled to the processing devices. The processing devices cooperate to process queue data within a shared message queue wherein when an individual processing device successfully accesses queue data the queue data is locked for the exclusive use of the processing device. When the processing device acquires the queue data, the queue data is locked and the queue data acquired by the acquiring processing device includes the queue data for both the primary processing device and additional processing device such that the processing device has all queue data necessary to process the data and return processed queue data.

18 Claims, 6 Drawing Sheets

MANAGING AN OUT-OF-ORDER ASYNCHRONOUS HETEROGENEOUS REMOTE DIRECT MEMORY ACCESS (RDMA) MESSAGE QUEUE

BACKGROUND OF THE INVENTION

The present disclosure relates generally to messaging between processing modules, and more particularly, the management of Remote Direct Memory Access (RDMA) in a multiple processor environment.

Direct memory access (DMA) is a feature of computers and microprocessors that allows certain hardware subsystems within the computer or microprocessor to access system memory for reading and/or writing independently of the central processing unit (CPU). Many hardware systems use DMA including but not limited to disk drive controllers, graphics cards, network cards, sound cards and graphics processing units (GPUs). DMA is also used for intra-chip data transfer in multi-core processors, especially in multiprocessor system-on-chips, where the processing elements may be equipped with a local memory and DMA is used for transferring data between the local memory and the main memory.

Remote Direct Memory Access (RDMA) allows data to move directly from the memory of one computer or microprocessor into that of another without involving the operating system. This permits high-throughput, low-latency networking, which is especially useful in massively parallel computer clusters. RDMA relies on a special philosophy in using DMA.

Message passing is a common feature between two cooperating computing systems. Asynchronous message passing is preferable for performance reasons. To support a full-duplex asynchronous messaging model, a queue, common to both message passing participants, is often used. In order to support full-duplex, both participants may manage the shared queue, which requires locking. Even though locking can be a performance hindrance, locking is arguably better than the complexity and overhead required for one participant to manage all queue operations.

Supporting a shared queue is more complicated in a heterogeneous memory system. Queue elements cannot simply be linked together with a simple linked list as the element pointers only translate in one of the two memory domains. This also means that a more complicated method must be used for managing the queue element order.

BRIEF SUMMARY OF THE INVENTION

Embodiments of the present disclosure are directed to systems and methods that are further described in the following description and claims. Advantages and features of embodiments of the present disclosure may become apparent from the description, accompanying drawings and claims.

One embodiment of the present disclosure provides a system operable to manage a message queue. This management may involve out-of-order asynchronous heterogeneous remote direct memory access (RDMA) to the message queue. This system includes a pair of processing devices, a primary processing device and one or more additional processing devices, a main memory storage location, and a data bus coupled to the processing devices and memory. Individual memory domains may be associated with each processing device. The processing devices cooperate to process queue data within a shared message queue wherein when an individual processing device successfully accesses queue data, the queue data is locked for the exclusive use of that individual processing device. The queue data acquired by the acquiring processing device includes the queue data for both the primary processing device and the partnered additional processing device such that the processing device has all queue data necessary to process the data and return processed queue data. It should be noted that only the processing device remote to the queue data is required to use RDMA to access the data.

According to another embodiment of the present disclosure, a method of managing and processing queue data to include out-of-order, asynchronous, heterogeneous data available through direct memory access of a message queue is provided. This method may involve determining, by a cooperating processing device, if the queue data to be processed by the cooperating process device is locked. If the queue data is unlocked, the cooperating process device will acquire a queue lock and the queue data. This provides the cooperating process device exclusive use of the queue data while the queue data remains locked. The queue data includes the queue data for a pair of cooperating processing devices which both may act on the queue data in a cooperative fashion. However exclusive use means that the cooperating process devices do not simultaneously process the queue data. The queue data acquired by the cooperating process device is processed to produce updated queue data which may then be outputted to provide updated queue data and the queue lock is released. The acquiring and locking of the queue data may involve an atomic GET process. Similarly the updating queue data and releasing the shared queue lock may involve an atomic PUT.

Yet another embodiment of the present disclosure may provide assistance operable to manage out-of-order, asynchronous, heterogeneous message queue made available via direct memory access (DMA). This system includes a pair of partnered processing devices such as a primary processing device and an additional processing device wherein a unique memory domain is associated with each processing device. The memory domains may be mapped to locations within a memory storage location shared or accessible to both processing devices via a data bus. The processing devices cooperate to process queue data within a shared message queue. Data is accessed via DMA and may involve locking queue data such that when one processing device is operating on queue data that processing device has exclusive use of the queue data for the pair of associated processing devices.

BRIEF DESCRIPTION OF THE SEVERAL VIEWS OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE INVENTION

Preferred embodiments of the present disclosure are illustrated in the FIGs., like numerals being used to refer to like and corresponding parts of the various drawings.

One embodiment of the present disclosure provides a system operable to manage a message queue. This management may involve out-of-order asynchronous heterogeneous remote direct memory access (RDMA) to the message queue. This system includes a pair of processing devices, a primary processing device and one or more additional processing devices, a main memory storage location, and a data bus coupled to the processing devices and memory. Individual memory domains may be associated with each processing device. The processing devices cooperate to process queue data within a shared message queue wherein when an individual processing device successfully accesses queue data, the queue data is locked for the exclusive use of that individual processing device. When a processing device acquires the queue data the queue data is locked, the queue data acquired by the acquiring processing device includes the queue data for both the primary processing device and the partnered additional processing device such that the processing device has all queue data necessary to process the data and return processed queue data.

Figure 1:
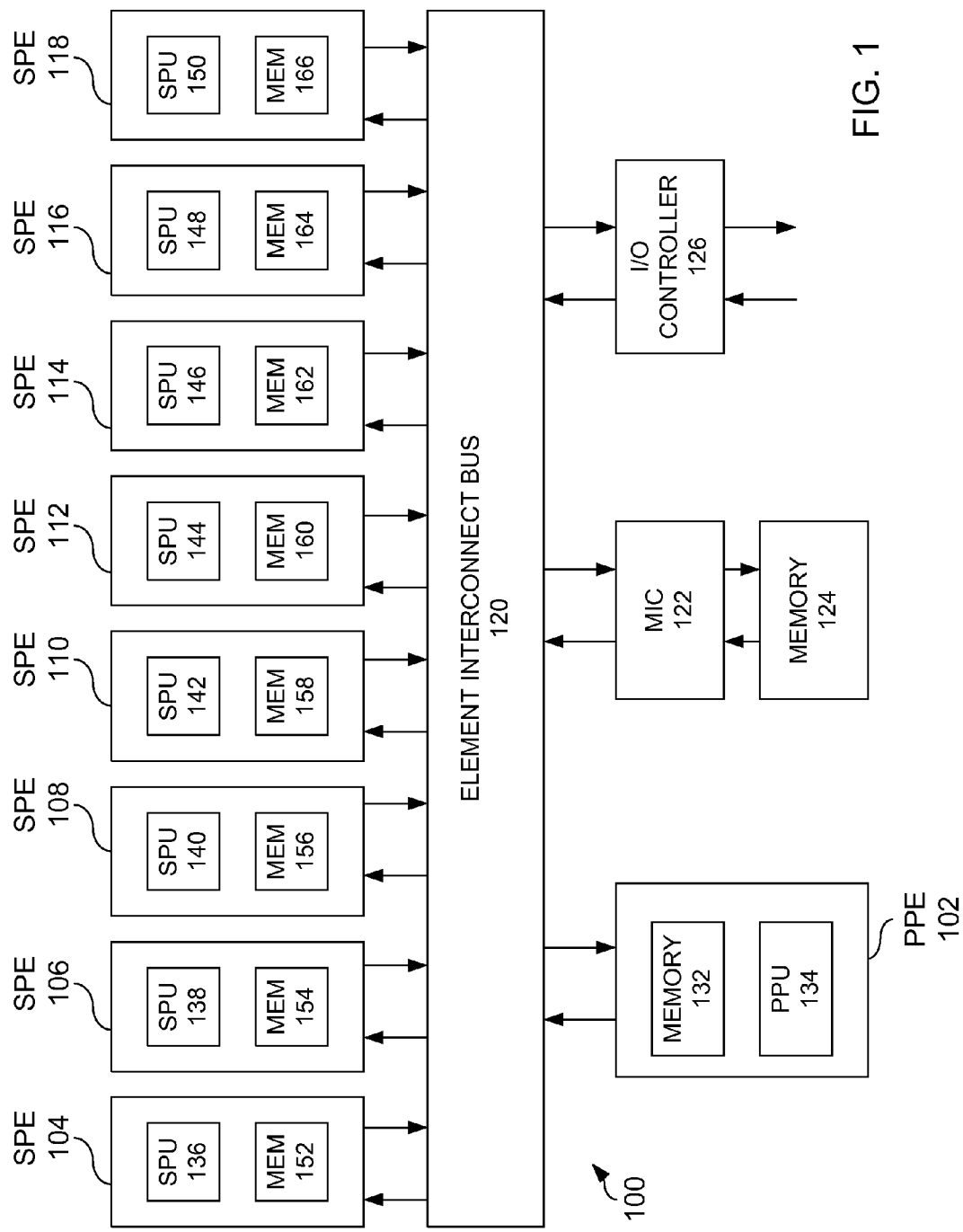
FIG. 1 provides a block diagram of a microprocessor that employs embodiments of the present disclosure.

FIG. 1 provides a block diagram of a microprocessor that employs embodiments of the present disclosure to manage an out-of-order asynchronous heterogeneous RDMA message queue. Such a microprocessor bridges the gap between conventional desktop processors and more specialized high-performance processors, such as the graphics-processors (GPUs). Embodiments may be found as a component in current and future digital distribution systems. As such embodiments may be utilized in high-definition displays and recording equipment, as well as computer entertainment systems for the HDTV era. Additionally the processor may be suited to digital imaging systems (medical, scientific, etc.) as well as physical simulation (e.g., scientific and structural engineering modeling).

Embodiments of the present disclosure overcome some of the complexities and inefficiencies of communications between two heterogeneous partners. The use of RDMA raises an issue in that two different memory domains are used to share information. This issue presents an inefficient situation where large amounts of DMA traffic pass between the two cooperating systems. Embodiments of the present disclosure may also provide the ability to take messages off the queue out of order and still efficiently process the messages. To facilitate management of the message queue, embodiments of the present disclosure may use vector operations to manage the queue. This disclosure may treat the queue itself as a vector or the queue management as a vector to facilitate the shifting of elements within the queue.

Microprocessor 100 includes a power processing element (PPE) 102, synergistic processing elements (SPEs) 104, 106, 108, 100, 112, 114 and 118, element interconnect bus (EIB) 120, a memory interface controller (MIC) 122, memory 124 and IO controller 126. The PPE 102 further includes a primary processing unit (PPU) 134 and memory 132. The SPEs each include a synergistic processing unit (SPU) 136, 138, 140, 142, 144, 146, 148 and 150 and local memory 152, 154, 156, 158, 160, 162, 164, 166. PPE 102 serves as the main processor coordinates a number of functional co-processors (where 8 SPEs 104-118 are shown), and a data bus (such as high-bandwidth EIB 120) connects PPE 102, input/output elements 126 and SPEs 104-118.

To achieve the high performance needed for mathematically intensive tasks, such as but not limited to decoding/encoding MPEG streams, generating or transforming three-dimensional data, or undertaking Fourier analysis of data, Microprocessor 100 couples the SPEs 104-118 and PPE 102 via EIB 120 to give access, via cache coherent direct memory access (DMA), to both main memory and to other external data storage. To facilitate the overlap of computations and data transfer, each of the nine processing elements (PPE 102 and SPEs 104-118) may be equipped with a DMA engine.

Since the SPE's load/store instructions may access only the SPE's own local memory, each SPE entirely depends on DMAs to transfer data to and from the main memory and other SPE's 104-118 local memories. A DMA operation can transfer either a single block area, or a list of such blocks. One design features of the microprocessor 100 is the use of DMAs as a central means of intra-chip data transfer, with a view to enabling maximal asynchrony and concurrency in data processing.

PPE 102 has control over the SPEs 104-118 and can start, stop, interrupt, and schedule processes running on the SPEs 104-118. To this end PPE 102 has additional instructions relating to control of the SPEs 104-118. Unlike SPEs 104-118, PPE 102 can read and write to the main memory and the local memories of SPEs 104-118 through the standard load/store instructions. In one embodiment, SPEs 104-118 may not be fully autonomous and require PPE 102 to prime the SPEs SPE before each SPE can do any useful work. The use of DMA as a method of data transfer and the limited local memory footprint of each SPE pose major challenges.

PPE 102 and the bus architecture include various modes of operation giving different levels of memory protection, allowing areas of memory to be protected from access by specific processes running on the SPEs 104-118 or PPE 102. Both the PPE and SPE may be based on reduced instruction set computing (RISC) architectures.

In one embodiment, PPE 102 may be a multithreaded core acting as the controller for the eight SPEs 104-118 shown. SPEs 104-118 handle most of the computational workload. In one embodiment, PPE 102 may work with conventional operating systems due to similarity to other 64-bit PowerPC processors, while the SPEs 104-118 may be designed for vectorized floating point code execution.

In one typical usage scenario, the system will load the SPEs 104-118 with small programs, chaining SPEs 104-118 together to handle individual tasks or steps within a complex operation. For instance, a set-top box might load programs for reading a DVD, video and audio decoding, and display, and the data would be passed off from SPE to SPE until finally ending up on the TV. Another possibility is to partition the input data set and have several SPEs 104-118 performing the same kind of operation in parallel.

EIB 120 is a communication bus internal to the Microprocessor 100 which connects the various on-chip system elements: PPE 102 processor, the memory controller (MIC), the eight SPE coprocessors, and off-chip I/O interfaces. EIB 120 may also include an arbitration unit which functions as a set of traffic lights.

RDMA supports networked computing by enabling data transfer directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly, reducing latency and enabling fast message transfer.

Embodiments of this disclosure provide a mechanism for managing a heterogeneous shared memory queue between two cooperating participants using RDMA. A common queue and lock may be used for maintaining queue coherency. Queue management data may reside wholly on one of the participating systems (i.e. the PPE or main memory available to the PPE). These performance enhancements are not at the expense of restricting the ability of the queue usage, such as out-of-order element removal.

One benefit of this method is that the method manages all the queue data with a single atomic operation which greatly improves upon systems that require multiple or nested locking. In addition, each queue's meta data is efficiently managed within a single vector using single instruction multiple data (SIMD) operations in an effort to improve performance. All of necessary data may be contained within a single locked entity to minimize synchronization overhead. This performance and efficiency is critical when dealing with cooperating systems using heterogeneous address spaces. This model also requires fewer RDMAs when managing the queue.

Each of the message passing participants may allocate a fixed-size message queue dedicated for incoming messages from the other participant. The fixed depth message queue is based on the vector length, for example a 16 byte vector can have at most 16 individual bytes, which means the queue can only be 16 entries deep. Each participant shares a pointer to this queue with the other participant. The queue local to the participant is for incoming messages and the other participants queue is for outgoing messages.

In addition, one participant (i.e. PPE) must allocate the queue locking-management data and share that with the other participant (i.e. SPE). This data must fit within an architectural atomic block. This means, as is typical, this data is remote to the non-allocating participant. The queue lock-info data consists of the following: (1) A single lock used to manage access to both participants' queues; (2) A queue order vector/array for each of the two queues. Using vectors allows for queue management to be done with SIMD for higher performance; and (3) A queue free index for each of the two queues.

Just as is with any shared queue, before the shared queue is accessed, the shared queue must be locked. The difference in this model is that in addition to obtaining the lock, the locker also obtains all the queue management data, for both queues, in a single atomic DMA. If the attempt to obtain the lock fails, so too does the acquisition of the queue management data. All the necessary pieces of queue data are acquired under this one lock to guarantee no live lock or out-of-order locking. Once the lock and queue information is successfully acquired queuing operations may take place.

Figure 2:
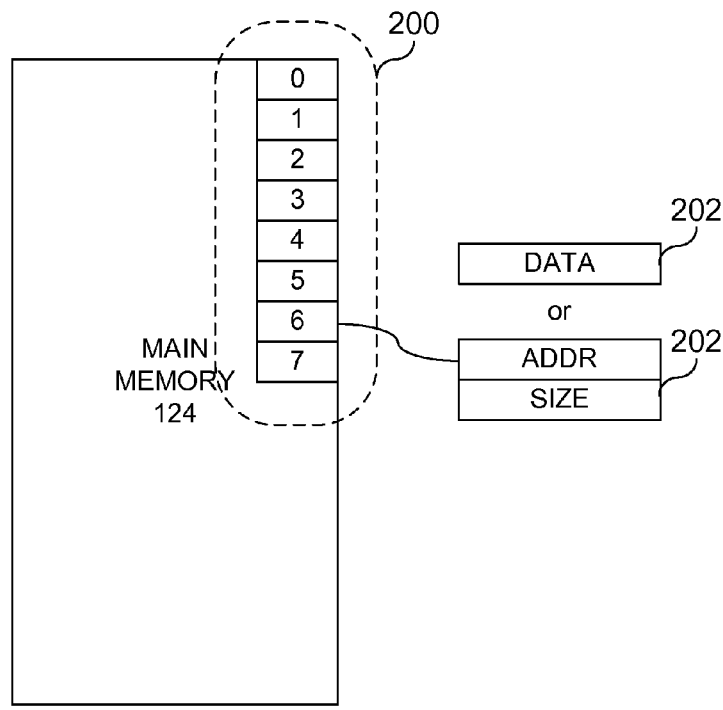
FIG. 2 is a diagram of main memory where main memory may contain a message queue in accordance with embodiments of the present disclosure.

FIG. 2 is a diagram of main memory 124, where main memory 124 may contain a message queue 200 wherein individual blocks of the message queue may comprise actual message data 202 or an address 204 and size 206 of the actual data to be RDMA in or out. This message queue may be available by DMA to either the PPE or the SPEs depending on whether elements within queue 200 are locked.

Figure 3:
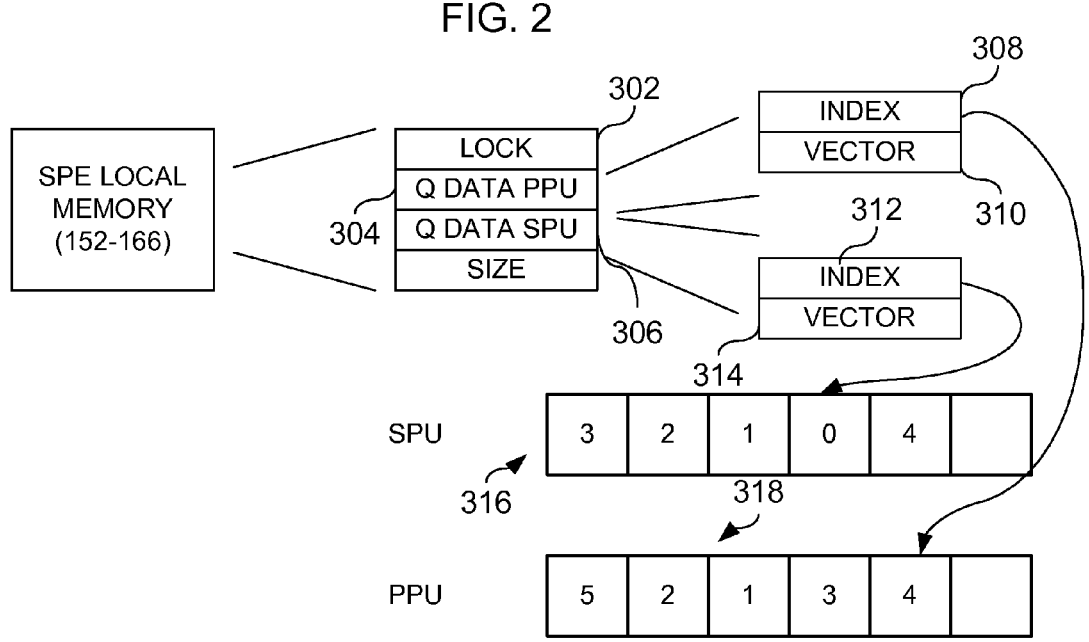
FIG. 3 shows the contents of local memory of an SPE in accordance with embodiments of the present disclosure.

FIG. 3 shows the contents of local memory 152-166 of an SPE. Both the PPE and SPE have access to main memory 124 and the local memory dedicated to the SPE may be mapped to Main Memory 124 as well. Queue data resides in main memory, the SPE local memory 152-166 will only contain local copies of queue data when the lock is acquired. Block 302 actually lives in main memory, not SPE local memory. A message queue, similar to that depicted in main memory 124 of FIG. 2, does reside in SPE local memory Queue data 302 may contain queue data 304 for the PPU and queue data 306 for the SPU. The queue data 304 for the PPU and queue data 306 for the SPU may be in the form of free indices 308 and 312 and vectors 310 and 314. The SPU will examine the SPE's queue first to determine whether or not any operations are to be performed. Only the local queue is searched. If nothing is found, the SPE posts a message entry in the PPE (remote) queue, based on the PPE's free index queue data. The vector may be an ordering for the SPU search while the index for the PPU may be a post order directing the SPU to post information to the next available entry within the PPU's queue. The operations to be performed may be taken out of order based on the stream I.D. FIG. 3 further indicates that SPU may have the arrays or vectors 316 and 318 of index locations to the PPUs and SPUs index locations. The PPUs and SPUs have separate indexes and the order of their vectors may differ, as is shown.

Figure 4:
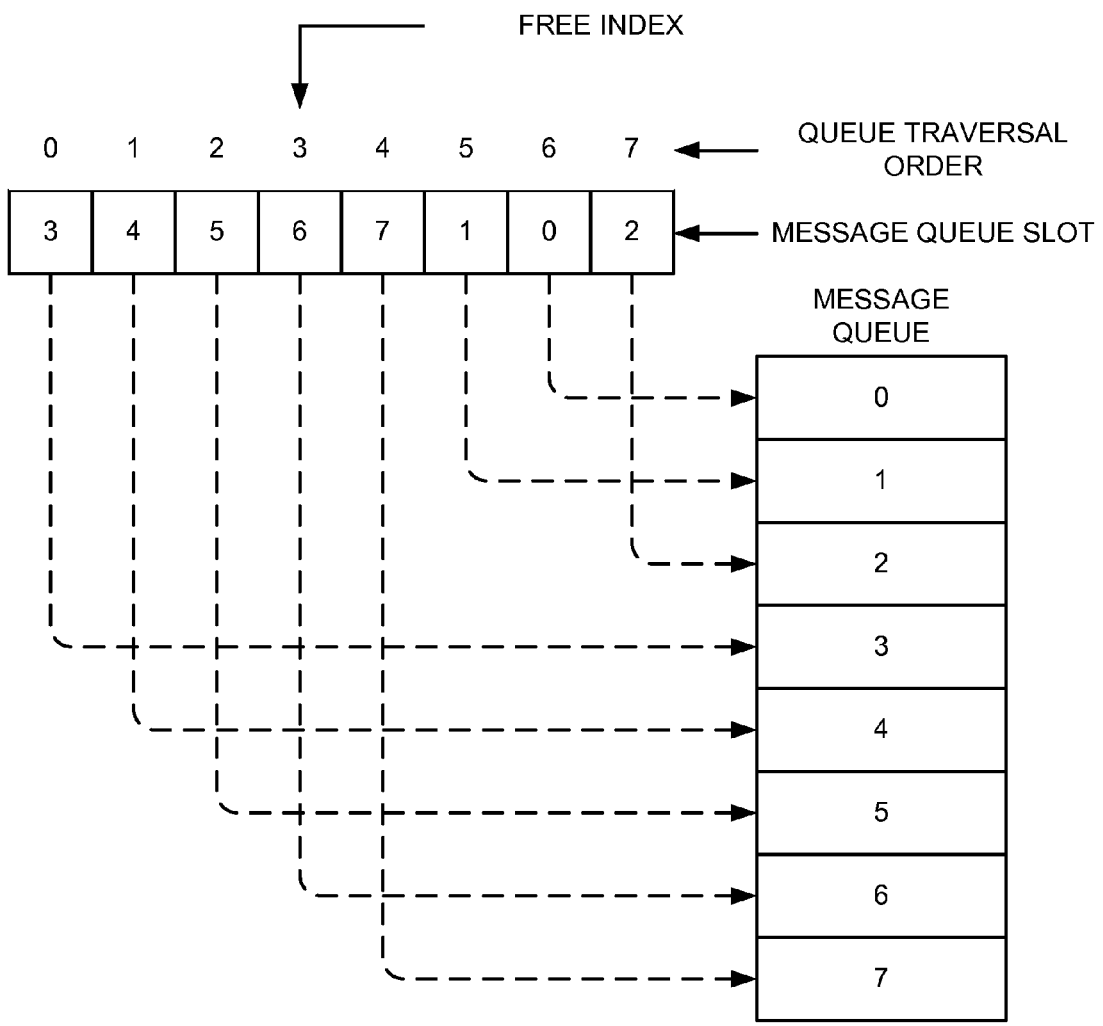
FIG. 4 depicts how the queue order is managed by using an ordering array of indices that correspond to an entry in the message queue in accordance with embodiments of the present disclosure.

FIG. 4 depicts how the queue order is managed by using an ordering array or vector of indices that correspond to an entry in the message queue in accordance with embodiments of the present disclosure. The array is traversed in ascending order starting at index 0. Each element of the array contains an index into the message descriptor array that corresponds to the order. At the same time an index of the next free ordering slot is maintained. This "free index" is used to indicate the next order slot to be allocated. This "free index" can also be used to determine the number of used ordering slots which is useful in truncating the traversal of the order array.

The contents and size of the message queue elements is insignificant as the message queue is indexed as an array of data that corresponds to the message. This data can be anything, but likely is Meta data describing the properties of a message or the message itself, if the message is small enough.

Figure 5:
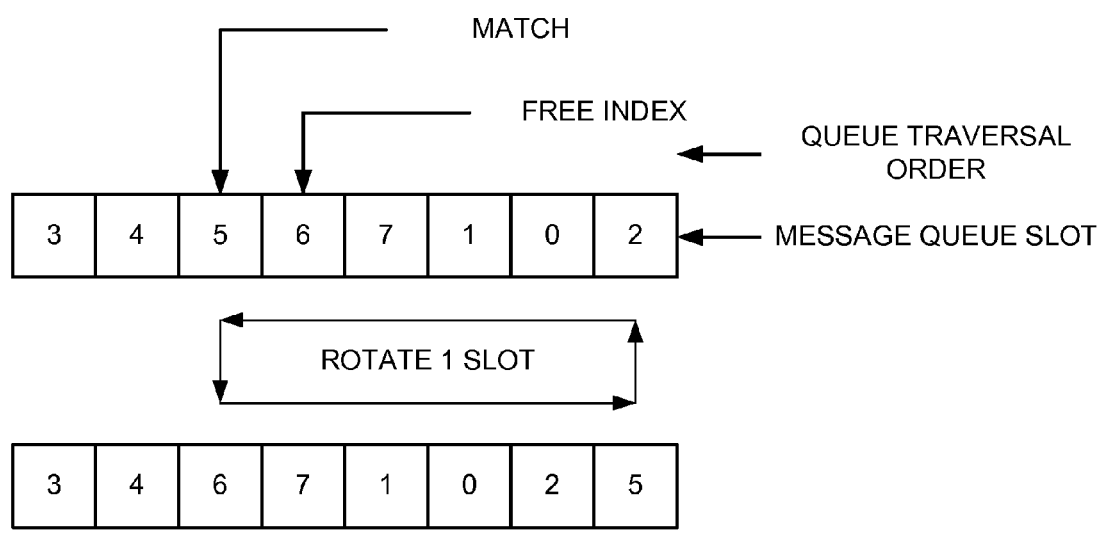
FIG. 5 depicts how to queue a new message in accordance with embodiments of the present disclosure.

FIG. 5 depicts how to queue a new message in accordance with embodiments of the present disclosure. The message queue slot at free index is filled in and free index is incremented. If free index is equal to the number of maximum queue entries then the queue is full and further attempts to add a message should get a queue full error.

The above scheme permits queue entries to be removed out-of-order. In order to remove a message from the queue the following steps are taken: (1) The queue order array is traversed, by ascending index up to the free index, looking for a message match at each corresponding message queue slot; (2) If a match is found, the contents of the queue ordering are shifted up, in order, starting at the slot following the match. The contents of the matching order slot are moved to the last slot entry; and (3) The free index is decremented.

Figure 6:
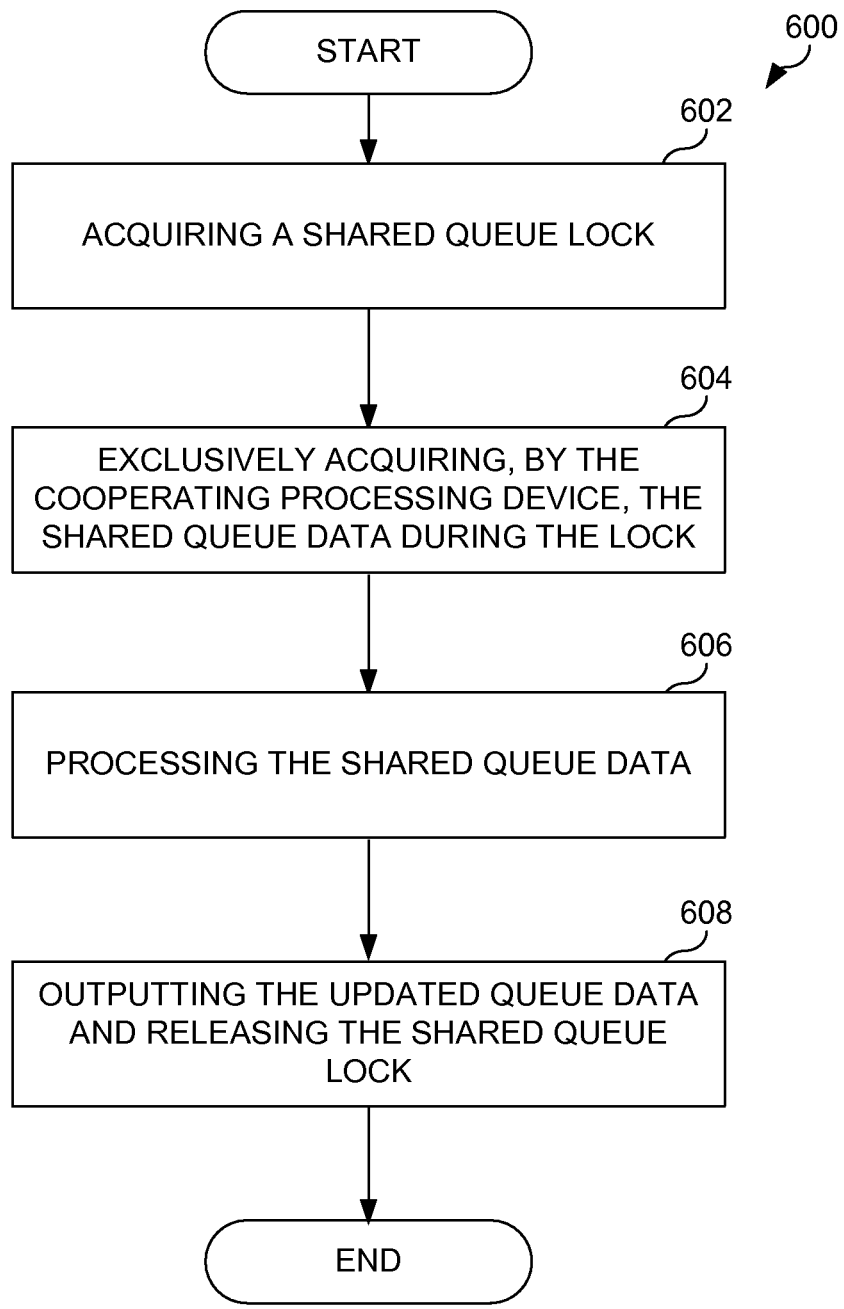
FIG. 6 provides a logic flow diagram in accordance with embodiments of the disclosure describing the passing of messages between cooperating processors.

FIG. 6 provides a logic flow diagram in accordance with embodiments of the disclosure describing the passing of messages between cooperating processors. Operations 600 begin with block 602 where a shared queue lock is acquired by a cooperating processor. In block 604, the cooperating processor exclusively acquires the shared queue data during the lock. This data may be actual data or may be an address of the actual data and size of the actual data to be processed by the cooperating processor. In block 606, the shared queue data, whether actual or a pointer, is processed, then the updated queue data and the shared queue lock may be written and released to main memory. This allows a partner cooperating processor to complete the transaction and ensures that the cooperating processing devices do not simultaneously process queue data and destroy queue data coherence.

Figure 7:
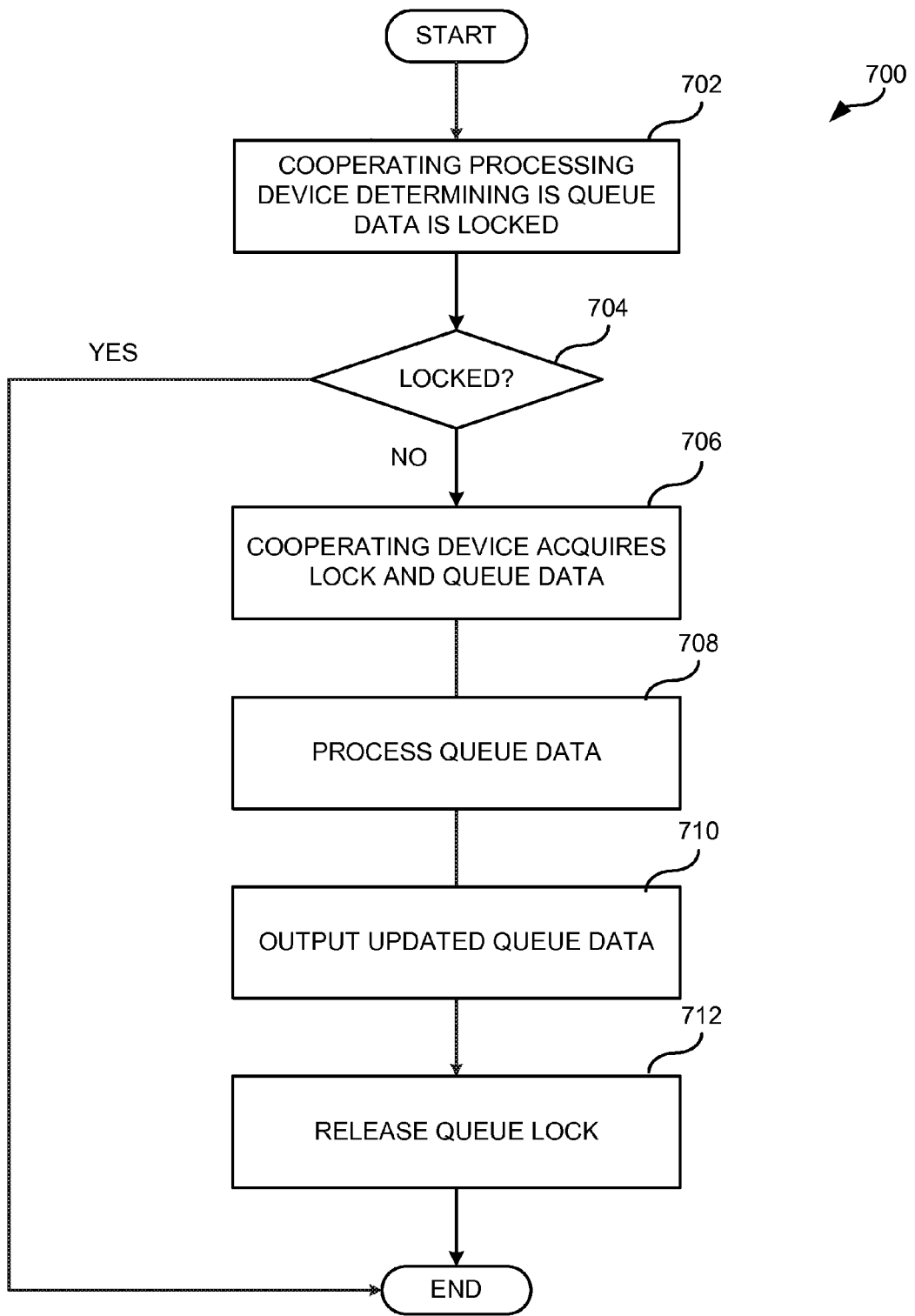
FIG. 7 provides a logic flow diagram in accordance with embodiments of the present disclosure further detailing the messaging process.

FIG. 7 provides a logic flow diagram in accordance with embodiments of the present disclosure further detailing the messaging process. Operations 700 begin with block 702 where a cooperating device determines whether queue data is locked. This requires first determining a location of the queue data to be processed and checking that location in main memory. At decision point 704, a determination is made as to whether or not the queue data is locked. If the queue data is locked, the cooperating processor will take no further actions on that queue data and allow the partnered cooperating processing device to complete the processing device's operations and provide unlocked queue data. In block 706, as the queue data was found to be not locked at decision point 704, the cooperating processing device acquires the lock and queue data. In block 708, the queue data may be processed, then in block 710 the updated queue data may be outputted allowing the queue lock to be released in block 712.

In summary, the present disclosure provides a system and method operable to manage a message queue is provided. This management may involve out-of-order asynchronous heterogeneous RDMA of the message queue. This system includes a pair of partnered processing devices, a primary processing device and an additional processing device, a memory storage location and a data bus. The data bus couples to the processing devices and memory storage locations. The processing devices cooperate to process queue data within a shared message queue wherein when an individual processing device successfully accesses queue data the queue data is locked for the exclusive use of the processing device. When the processing device acquires the queue data, the queue data is locked and the queue data acquired by the acquiring processing device includes the queue data for both the primary processing device and additional processing device such that the processing device has all queue data necessary to process the data and return the resultant data as processed queue data.

As one of average skill in the art will appreciate, the term "substantially" or "approximately", as may be used herein, provides an industry-accepted tolerance to the term's corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust the signal's current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A system, comprising:
   a first processing device having a first local memory for incoming messages from a second processing device;
   the second processing device having a second local memory for incoming messages from the first processing device;
   a memory storage location, wherein the first and second local memories are mapped to the memory storage location; and
   a data bus coupled to the first processing device, the second processing device, and the memory storage location, wherein:
   the first processing device and the second processing device cooperate to process queue data within a shared message queue of the memory storage location, wherein the queue data comprises first processing device queue data and second processing device queue data;
   the first processing device and the second processing device access the queue data within the shared message queue via remote direct memory access (RDMA); and
   responsive to at least one of the first and second processing devices accessing the shared message queue via an RDMA operation, a lock is automatically placed on the shared message queue, and wherein the at least one of the first and second processing devices obtaining the lock obtains exclusive use of the queue data and obtains both the first processing device queue data and the second processing device queue data by copying to the respective first or second local memory the first processing device queue data and the second processing device queue data.

2. The system of claim 1, wherein the queue data acquired from the shared message queue comprises all data necessary to manage the queue.

3. The system of claim 1, wherein the first processing device comprises a power processing unit (PPU).

4. The system of claim 3, wherein the second processing device comprises a synergistic processing unit (SPU).

5. The system of claim 1, wherein, to retrieve the queue data in the shared message queue, at least one of the first and second processing devices:
   checks to see if the queue data is locked;

responsive to the queue data being unlocked, performs an atomic GET to retrieve and lock the queue data in a single RDMA;

operate on the queue data to produce updated queue data; and performs an atomic PUT to return the updated queue data.

6. The system of claim 1, wherein another processing device cannot operate on the queue data when the queue data is locked.

7. A method comprising:

determining, by a first processing device having a first local memory for incoming messages from a second processing device, if a shared queue data in a memory storage location to be processed by the first processing device is locked, the second processing device having a second local memory for incoming messages from the first processing device;

responsive to determining that the shared queue data is unlocked, acquiring, by the first processing device, the shared queue data by copying the shared queue data to the first local memory and acquiring a shared queue lock in a single RDMA providing exclusive use of the shared queue data by the first processing device, wherein the shared queue data acquired comprises queue data for the first processing device and queue data for the second processing device;

processing the shared queue data, by the first processing device, to produce updated queue data; and outputting the updated queue data to the memory storage location and releasing the shared queue lock.

8. The method of claim 7, wherein:

acquiring the shared queue data and the shared queue lock comprises an atomic GET; and outputting the updated queue data and releasing the shared queue lock comprises an atomic PUT.

9. The method of claim 7, wherein acquiring the shared queue data and the shared queue lock when the shared queue data is unlocked comprises:

fetching the queue data from the memory storage location;

setting a lock flag to locked; and writing the queue data with a locked lock flag to the memory storage location.

10. The method of claim 7, wherein the queue data comprises actual data to be processed.

11. The method of claim 7, wherein the queue data comprises an address and size associated with actual data to be processed.

12. A system comprising:

a first processing device wherein a first memory domain is associated with the first processing device;

a second processing device wherein a second memory domain is associated with the second processing device;

a memory storage location, wherein the first memory domain and the second memory domain are mapped to locations within the memory storage location;

a data bus coupled to the first processing device, the second processing device, and the memory storage location, wherein:

the first processing device and the second processing device cooperate to process queue data within a shared message queue of the memory storage location, wherein the queue data comprises first processing device queue data and second processing device queue data;

the first processing device and the second processing device access the queue data within the shared message queue via direct memory access (DMA); and responsive to at least one of the first and second processing devices accessing the shared message queue, a lock is automatically placed on the shared message queue and the queue data retrieved in a single RDMA, and wherein the at least one of the first and second processing devices obtaining the lock obtains exclusive use of the queue data and obtains both the first processing device queue data and the second processing device queue data; and wherein a queue order in the shared message queue is managed by an ordering array of indices that correspond to entries in the shared message queue, and wherein queue entries may be removed from the queue out-of-order by:

traversing a queue order array by ascending index up to a free index looking for a message match at each corresponding message queue slot;

in response to a message match being found, shifting contents of the queue order array up, in order, starting at a message queue slot following the slot of the message match;

moving the contents of the message match slot to a last slot entry; and decrementing the free index.

13. The system of claim 12, wherein the queue data acquired when the queue data is locked comprises first processing device queue data and second processing device queue data necessary to manage the shared message queue.

14. The system of claim 12, wherein the first processing device comprises:

a power processing unit (PPU); and a main memory location.

15. The system of claim 14, wherein the second processing device comprises:

a synergistic processing unit (SPU); and a local memory location.

16. The system of claim 12, wherein, to retrieve the queue data in the shared message queue, at least one of the first and second processing devices:

checks to see if queue data is locked;

responsive to determining that the shared queue data is unlocked, performs an atomic GET to retrieve and lock the queue data in the single RDMA;

operate on the queue data to produce updated queue data; and performs an atomic PUT to return the updated queue data.

17. The system of claim 12, wherein another processing device cannot operate on the queue data when the queue data is locked.

18. A system, comprising:

a first processing device;

a second processing device;

a memory storage location; and a data bus coupled to the first processing device, the second processing device, and the memory storage location, wherein:

the first processing device and the second processing device cooperate to process queue data within a shared message queue of the memory storage location, wherein the queue data comprises first processing device queue data and second processing device queue data;

the first processing device and the second processing device access the queue data within the shared message queue via remote direct memory access (RDMA); and responsive to at least one of the first and second processing devices accessing the shared message queue via an RDMA operation, a lock is automatically placed on the shared message queue, and wherein the at least one of the first and second processing devices obtaining the lock obtains exclusive use of the queue data and obtains both the first processing device queue data and the second processing device queue data; and wherein a queue order in the shared message queue is managed by an ordering array of indices that correspond to entries in the shared message queue, and wherein queue entries may be removed from the queue out-of-order by:

traversing a queue order array by ascending index up to a free index looking for a message match at each corresponding message queue slot;

in response to a message match being found, shifting contents of the queue order array up, in order, starting at a message queue slot following the slot of the message match;

moving the contents of the message match slot to a last slot entry; and decrementing the free index.

* * * * *